Patented Aug. 4, 1942

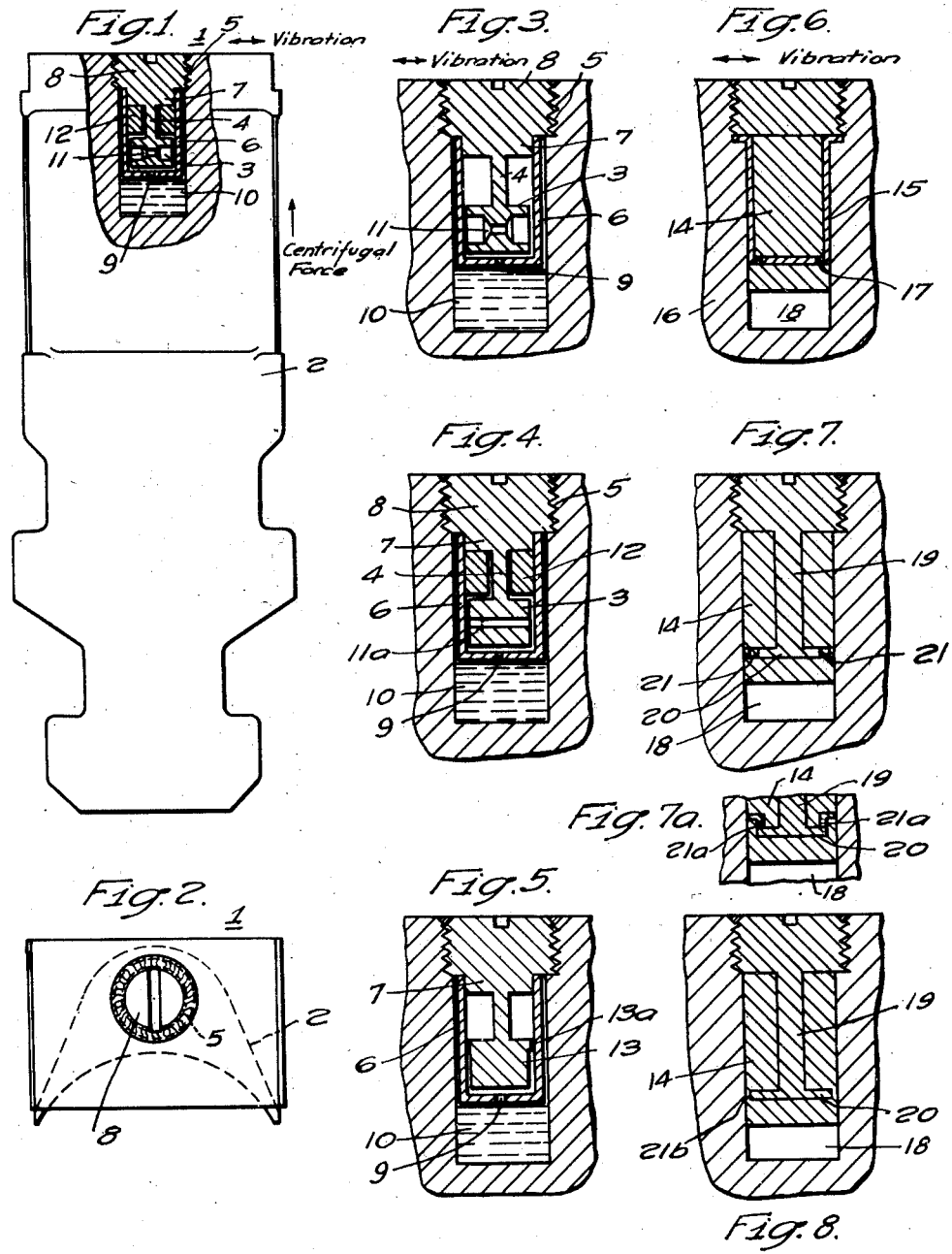

2,292,072

UNITED STATES PATENT OFFICE 2,292,072

TURBINE BLADE VIBRATION DAMPER

Clinton R. Hanna, Pittsburgh, and Stanley J. Mikina, Wilkinsburg, Pa., assignors to Westinghouse Electric & Manufacturing Company, East Pittsburgh, Pa., a corporation of Pennsylvania Application January 10, 1940, Serial No. 313,246

15 Claims. (Cl. 253—77)

Our invention relates to a hydraulic damping device, more specifically, to a hydraulic damping device which is particularly suitable for minimizing or preventing vibrations in a turbine blade or other similar rotatable elastic body.

The blades of steam turbines are nearly frictionless, elastic beams built in at the base or root to the turbine spindle, and either free at the extremity or joined together with shrouding into banks of blades. Such individual blades or groups of blades are very susceptible to vibration during operation of the turbine because they possess no damping other than the negligibly small amount due to internal friction in a stressed material or slight friction in the clamping. Such blades are often subject to severe periodic disturbances which may cause resonant vibrations of the blading during either starting or stopping of the machine. Moreover, resonant vibrations of the blading may occur at the running speed either due to the periodic pulses arising from a moving blade passing a series of stationary blades or nozzles, or due to self-excited pulsating pressures associated with the flow of steam through small clearances between adjacent blades, or between moving blades and a stationary housing.

An object of our invention is to provide a damper which will reduce the amplitude of forced resonant vibrations and which will prevent self-excited vibrations from building up by the provision of comparatively large damping forces effected by hydraulic means.

Other objects and advantages will become more apparent from a study of the following specification when considered in conjunction with the accompanying drawing, in which:

Figure 1 is a view partly in cross section of a portion of a turbine blade embodying the principles of our invention;

Fig. 2 is a top view of the turbine blade shown in Fig. 1; and

Figs. 3 to 7, 7a and 8 are different modifications of a damping device adapted to be mounted on the turbine blade shown in Figs. 1 and 2.

Referring more particularly to Figs. 1 and 2, the damper 1 is shown in a form for application to a short, rigid, high-frequency impulse blade 2 of a high-pressure, high-temperature turbine. Such turbines operate at pressures above 1,000 pounds per square inch, and at temperatures of the order of 850° F. At these high temperatures it is proposed that the damping liquid of the damper be a solid which melts and becomes fluid at the operating turbine temperatures.

As shown in Fig. 1 and in the enlarged Fig. 3, damping action is secured by causing a liquid to be pumped through an orifice from one side of a piston to the other during blade vibration. The piston may be regarded as tending to remain stationary due to its inertia while the remainder of the blade assembly vibrates laterally. The piston 3 may be cylindrical in shape and is supported by a thin strut 4 so that it is free to move without being locked in position by the large centrifugal forces to which it is subjected. The entire damper assembly 1 is screwed into a hole 5 drilled in the end of the blade 2 by means of a threaded plug 8 and is sealed off by welding or silver-soldering. By utilizing the tip of the blade in this way, the damping forces are applied at the point of greatest vibration, where they will be most effective in inhibiting the vibration, and the strength of the blade is least impaired because the blade tip is the least stressed part of the blade. The damping liquid is confined around the piston by means of a thin-walled sleeve 6 which is pressed over a shoulder 7 turned on the threaded plug 8 supporting the integrally machined piston. An important part of our invention is the provision of a small orifice 9 in the above sleeve through which the hot liquid can pass from the reservoir 10 into the cylinder housing the piston. By making the cylinder orifice 9 small as compared to the orifice 11 in the piston, the liquid is forced to flow through the piston orifice and no loss of damping occurs as a result of liquid yielding into an unconfined free surface instead of flowing through the damping orifice. The reservoir 10 provided below the damper is filled with the appropriate solid material during assembly and when the material becomes liquid at the high operating temperatures, it is driven through the small orifice 9 in the cylinder by the large centrifugal forces present.

To reduce the size of the reservoir required to fill the piston cylinder, the space in the cylinder around the thin strut supporting the piston may be filled with a split sleeve 12 over which the cylinder liner or sleeve 6 is pressed as shown in Fig. 4. The split sleeve has adequate clearance around the strut 4 to allow the piston to vibrate. The piston orifice 11a may be of the same diameter throughout as shown in Fig. 4 or may be tapered as is orifice 11 in Fig. 3. The remaining parts of the damping device are identical to those shown in Fig. 3, hence further description thereof is deemed unnecessary.

Relative motion between the piston and the turbine blade is secured by either making the natural frequency of the piston on the strut 4 (in bending) low as compared to the natural frequency of the blade, or by making the piston frequency equal to the blade frequency. In the first case, for example, for a blade frequency of 2,000 cycles/sec., a piston frequency of 500 cycles/sec. or less would result in practical isolation of the piston from the blade, and the relative movement of the blade with respect to the piston would be equal to the blade amplitude. If the acceleration forces of the fluid surrounding the piston are small, i. e., if the fluid density is low and the laterally accelerated fluid column is short, the piston will remain practically stationary and the full blade amplitude will be effective in driving the damping fluid from one side of the piston to the other. In the case where the piston frequency is tuned to the blade frequency, large relative movements between blade and piston may be secured, but the damper performance will be erratic with slight changes in tuning, which will require accurate adjustment.

Calculations have shown that the radial clearance between the piston and the concentric cylinder may act as the orifice, leading to the simplified modification shown in Fig. 5.

Referring to Fig. 5, the flange 13 on the piston is turned (by machine operation) to a small clearance with respect to the cylindrical sleeve 6. The upper portion of piston 13 preferably has a small collar or ring-shaped projection 13a which has a smaller clearance with respect to sleeve 6 to restrict leakage in an upward direction but at the same time allow relative movement as the result of the blade vibration. The damper unit or cartridge in Fig. 5 does not require any angular positioning of the piston with respect to the direction of vibration. The embodiments with an orifice through the piston (Figs. 3 and 4) require the orifice axis to be parallel to the direction of blade vibration. The entire assembly may be fitted into a ½" diameter hole in the blade tip. The remaining elements of Fig. 5 correspond exactly to those of Fig. 3.

The requirements for a suitable liquid for the damper are that the material shall have a melting point well below 850° F., a boiling point above this temperature and no appreciable chemical reaction either with the blade and damper steel or with the silver solder that might possibly be used to seal the entire damper assembly at the outer plug joint. Tin, cadmium and zinc were found to be unsuitable because of reaction with the steel to form liquid solutions. Lead is inactive, and its damping capacity can be realized despite its high density. The non-metals seemed to offer the best possibilities. Among the most promising are:

1. *Metaboric acid.*—This is a white crystalline powder that fuses into a low melting point glass of great fluidity at about 450° F., and does not react either with steel or with silver solders. It has a specific gravity of 2. In general, a boric acid containing from 15 to 25% of water by weight will have a low enough melting point to be satisfactory.

2. *Potassium nitrate.*—This is inactive, has a density of 2.1, a melting point of 632° F. and when confined as here remains fluid above 850° F.

3. *Sodium nitrate.*—A specific gravity of 2.26, melting point of 585° F., and remains fluid at 850° F. or higher when confined under its own vapor pressure.

The dampers disclosed in Figs. 6, 7 and 8 are simpler than those illustrated in Figs. 3, 4 and 5, but have been found very effective. Instead of a solid inertia piston which tends to remain stationary during vibration and to force a light liquid through restrictions of a confined volume, the dampers use a heavy liquid, such as molten lead, which acts as an inertia piston and forces itself through restrictions having the proper flow characteristic for optimum blade damping. The essence of the invention in Figs. 6, 7 and 8 is the securing of a completely filled confined volume of fluid which is in readiness to force liquid out one orifice and to draw liquid in another orifice when subjected to the least acceleration.

In Fig. 6, the confined lead 14 is within the cup-shaped member 15 with two orifices 16 and 17 at the bottom, communicating with a filling chamber 18 which is only partially filled. The lead is shown in the position which it assumes under the action of centrifugal force and melting heat. The vibration forces lead out one orifice and the centrifugal force acting on the lead within the filling chamber replenishes the confined volume through the other orifice. A lateral gradient of pressure can exist in the confined volume, but not in the filling chamber because of the free surface of liquid in the filling chamber.

Two additional orifices (not shown) on a diameter 90° from that of the orifices shown will allow damping for transverse vibration without affecting the damping in the first plane.

Fig. 7 shows a one piece structure with a heavy stem 19 supporting a bottom plate or disc 20 having orifices 21. Four orifices may be used as in Fig. 6. Fig. 7a is like Fig. 7 except that the orifices 21a therein are provided at right angles to those in Fig. 7 and are formed on a flange struck about the rim of disc 20. We have found that the liquid emerging from the orifices tends to move as a column, hence by providing a structure such as shown in Fig. 7a, the column will not be moved against centrifugal force, hence the flow should be better. Also standing waves or ripples which tend to form on the free surface are minimized by this construction. An annular clearance 21b as shown in Fig. 8 will serve with almost as good performance, without the necessity of orifices such as 21 in Fig. 7 or 21a as in Fig. 7a.

The magnitude of damping depends upon the ratio of the lead mass to the blade mass. The impedance of the orifices to fluid flow is related to the mass reactance of the confined lead for best results, being approximately equal to it when the lead mass bears a small ratio to the blade mass. For a ratio of 1:10 it is theoretically possible to obtain blade damping equivalent to approximately 15% decay in amplitude per cycle of free vibration. This figure has been obtained experimentally. The blades by themselves, even under conditions of high temperature, have a decrement of only 1½% per cycle or less.

We are, of course, aware that others, particularly after having had the benefit of the teachings of our invention, may devise other devices embodying our invention, and we, therefore, do not wish to be limited to the specific showings made in the drawing and the descriptive disclosure hereinbefore made.

We claim as our invention:

1. In combination with a rotary engine having a blade which is adapted to be rotated at a substantially high speed in an atmosphere of substantially high temperature, a damper comprising a suspended element extending into a chamber formed in said blade containing a substance which is in solid form at ordinary room temperatures and which has a relatively high melting point and forms a liquid during normally high temperature operation of said rotatable blade, restriction means including said liquid for restricting freedom of movement of said suspended element within said chamber thereby minimizing vibration of said blade normally due to high speed rotation thereof.

2. A turbine blade having formed at the radial extremity thereof a chamber, an element which projects into said chamber and which is suspended by a flexible suspension means therefor which, due to inertia, tends to remain stationary while the blade vibrates as it is rotated at relatively high speeds, a substance contained within said chamber which is in solid form at normal room temperatures but which becomes a liquid and surrounds said element at the relatively high temperatures at which said blade normally operates.

3. A turbine blade having formed at the radial extremity thereof a chamber, an element which projects into said chamber and which is suspended by a flexible suspension means therefor which, due to inertia, tends to remain stationary while the blade vibrates as it is rotated at relatively high speeds, a substance contained within said chamber which is in solid form at normal room temperatures but which becomes a liquid and surrounds said element at the relatively high temperatures at which said blade normally operates, restriction means including said liquid for restricting freedom of movement of said suspended element within said chamber thereby minimizing vibration of said body normally due to high speed rotation thereof.

4. A turbine blade having formed at the radial extremity thereof a chamber, an element which projects into said chamber and which is suspended by a flexible suspension means therefor which, due to inertia, tends to remain stationary while the blade vibrates as it is rotated at relatively high speeds, a substance contained within said chamber which is in solid form at normal room temperatures but which becomes a liquid and surrounds said element at the relatively high temperatures at which said blade normally operates, said substance being of the group comprising lead, metaboric acid, potassium nitrate and sodium nitrate.

5. A turbine blade having formed at the radial extremity thereof a chamber, an element which projects into said chamber and which is suspended by a flexible suspension means therefor which, due to inertia, tends to remain stationary while the blade is adapted to vibrate when said blade is rotated at relatively high speeds, a substance contained within said chamber which is in solid form at normal room temperatures but which becomes a liquid and surrounds said element at the relatively high temperatures at which said blade normally operates, restriction means contained within said chamber and including said liquid for restricting freedom of movement of said suspended element within said chamber thereby minimizing vibration of said body normally due to high speed rotation thereof, said substance having a melting point greater than 400° F.

6. A turbine blade having formed at the radial extremity thereof a chamber, an element which projects into said chamber and which is suspended by a flexible suspension means therefor which, due to inertia, tends to stay stationary while the blade vibrates as the result of rotation thereof at relatively high speeds, a substance contained within said chamber which is in solid form at normal room temperatures but which becomes a liquid and surrounds said element at the relatively high temperatures at which said blade normally operates, said suspended element having restricted orifice means therein coacting with said liquid for the purpose of restraining or snubbing the relative movement between the suspended element and chamber walls that is induced as the result of vibration of said turbine blade during high speed rotation thereof.

7. A turbine blade having formed at the radial extremity thereof a cylindrical chamber coaxially disposed along the radial direction of said blade, a piston which projects into said chamber and which is suspended from approximately the radial extremity of said blade, a substance contained within said chamber for restraining relative movement between said piston and chamber walls when said substance is subjected to a higher than melting temperature, said substance being of relatively high specific gravity and having a relatively high melting point.

8. A turbine blade having formed at the radial extremity thereof a cylindrical chamber coaxially disposed along the radial direction of said blade, a piston which projects into said chamber and which is suspended from approximately the radial extremity of said blade, said piston being perforated on its working surface, a substance contained within said chamber for restraining relative movement between said piston and chamber walls when said substance is subjected to a higher than melting temperature, said substance being of relatively high specific gravity and having a relatively high melting point.

9. A turbine blade having formed at the radial extremity thereof a cylindrical chamber coaxially disposed along the radial direction of said blade, a piston which projects into said chamber and which is suspended from approximately the radial extremity of said blade, a screw threaded plug having a strut depending therefrom for suspending said piston, said piston being adapted to vibrate laterally of the radial direction of said blade together with the chamber walls as the result of vibration of the blade due to high speed rotation thereof, a body of lead surrounding said piston and adapted, due to its inertia, to dampen said vibration when said lead is immersed in a sufficiently high temperature atmosphere as to effect melting.

10. A turbine blade having formed at the radial extremity thereof a cylindrical chamber coaxially disposed along the radial direction of said blade, a substance contained within said chamber which is in fluid condition during normal operating temperatures of the blade, a piston which projects into said chamber and which is suspended from approximately the radial extremity of said blade, a screw threaded plug having a strut depending therefrom for suspending said piston, which piston, due to its inertia, tends to stay stationary while the blade vibrates laterally of the radial direction thereof as the result of vibration of the blade due to high speed rotation thereof, said piston being perforated on its working surface, thereby allowing restricted flow of fluid through the perforations thereof as the result of natural vibration inherently accompanying high speed rotation of said blade, thereby minimizing said natural vibration.

11. A turbine blade having formed at the radial extremity thereof a cylindrical chamber coaxially disposed along the radial direction of said blade, a cylinder which projects into said chamber and which is suspended from approximately the radial extremity of said blade, said cylinder being hollow and perforated at its lower disc-like surface, a reservoir containing a substance of high specific gravity and which is in liquid form during normal operating temperatures of the blade, said substance contained immediately below said perforations to allow flow therethrough as the result of centrifugal force when said blade is rotated at high speed and subjected to normal operating temperatures, said cylinder being adapted to vibrate with respect to the walls of said chamber as the result of said high speed rotation thereby forcing said substance back and forth through said perforations as the result of the inertia of said substance which results in a dampening of such relative vibration.

12. A turbine blade having a chamber formed therein containing a substance which is in a liquid state only at the normally high operating temperatures of turbines, a suspended element in said chamber which becomes surrounded by said liquid at said normally high operating temperatures, restricting means comprising said liquid for restricting freedom of vibratory movement of said suspended element within said chamber thereby minimizing vibration of said blade ordinarily caused during normal operation of said blade.

13. A turbine blade having at is extremity a hermetically sealed chamber formed therein containing a substance which is in a liquid state at normally high operating temperatures, a suspended element in said chamber which becomes surrounded by said liquid at said normally high operating temperatures, restricting means formed in said suspended element and coacting with said liquid for restricting freedom of vibratory movement of said suspended element within said chamber thereby minimizing vibration of said blade ordinarily caused during normal operation of said blade.

14. A rotary engine having a blade which is normally rotated at a substantially high speed, means for minimizing vibration of said blade ordinarily resulting during normal rotation of said blade including a chamber formed in said blade adjacent the periphery thereof, a suspended vibratable element having one end secured to said blade and another end projecting into said chamber, a substance in said chamber which is in liquid form during normal rotation of said body, and restricting orifice means in said suspended vibratable element coacting with said liquid for damping vibration of said element in said fluid.

15. A rotary engine having a blade which is normally rotated at a substantially high speed, means for minimizing vibration of said blade ordinarily resulting during normal rotation of said blade including a chamber formed in said blade adjacent the periphery thereof, a suspended vibratable element having one end secured to said blade and another end projecting into said chamber, a substance in said chamber which is in liquid form during normal rotation of said body, said vibratable element and a wall portion of said chamber forming a narrow passage through which fluid is forced during vibratory movements of said element thereby affording a damping action thereto.

CLINTON R. HANNA.
STANLEY J. MIKINA.